United States Patent
Ishibashi et al.

Patent Number: 6,088,508
Date of Patent: Jul. 11, 2000

[54] METHOD OF OPERATING VACUUM PUMP

[75] Inventors: Yoshimitsu Ishibashi, Ayase; Katsuaki Usui, Fujisawa, both of Japan

[73] Assignee: Ebara Corporation, Tokyo, Japan

[21] Appl. No.: 09/143,102

[22] Filed: Aug. 28, 1998

[30] Foreign Application Priority Data

Sep. 2, 1997 [JP] Japan .................................. 9-252836

[51] Int. Cl.⁷ .................................................. H02P 5/00
[52] U.S. Cl. ............................................. 388/800; 318/3
[58] Field of Search ................................ 388/800, 825; 318/3, 727, 779

[56] References Cited

U.S. PATENT DOCUMENTS

| | | | |
|---|---|---|---|
| 4,398,996 | 8/1983 | Bolton et al. | 162/198 |
| 4,461,633 | 7/1984 | Bodovsky | 55/283 |
| 4,506,405 | 3/1985 | Block | 15/320 |
| 4,569,319 | 2/1986 | Thoma | 123/357 |
| 5,284,180 | 2/1994 | Guo et al. | 137/488 |
| 5,415,616 | 5/1995 | Wright | 494/16 |
| 5,553,507 | 9/1996 | Basch et al. | 73/863.01 |
| 5,814,913 | 9/1998 | Ojima et al. | 310/112 |

FOREIGN PATENT DOCUMENTS

| | | |
|---|---|---|
| 43 18 214 A1 | 12/1994 | Germany . |
| 60-190696 | 9/1985 | Japan . |

OTHER PUBLICATIONS

Copy of European Patent Office Communication for European Patent Application No. 98116576.4 with European Search Report dated Oct. 27, 1999.

*Primary Examiner*—Robert E. Nappi
*Assistant Examiner*—Rina I. Duda
*Attorney, Agent, or Firm*—Armstrong, Westerman, Hattori, McLeland & Naughton

[57] ABSTRACT

A vacuum pump for use in an evacuating system for a semiconductor fabrication apparatus is operated at a steady rotational speed to evacuate the semiconductor fabrication apparatus. Then, in response to a signal indicative of an operating state of the semiconductor fabrication apparatus which does not need to be evacuated, the rotational speed of the vacuum pump is reduced to an idling rotational speed, thereby to lower electric energy consumption by the vacuum pump.

4 Claims, 2 Drawing Sheets

F I G. 1
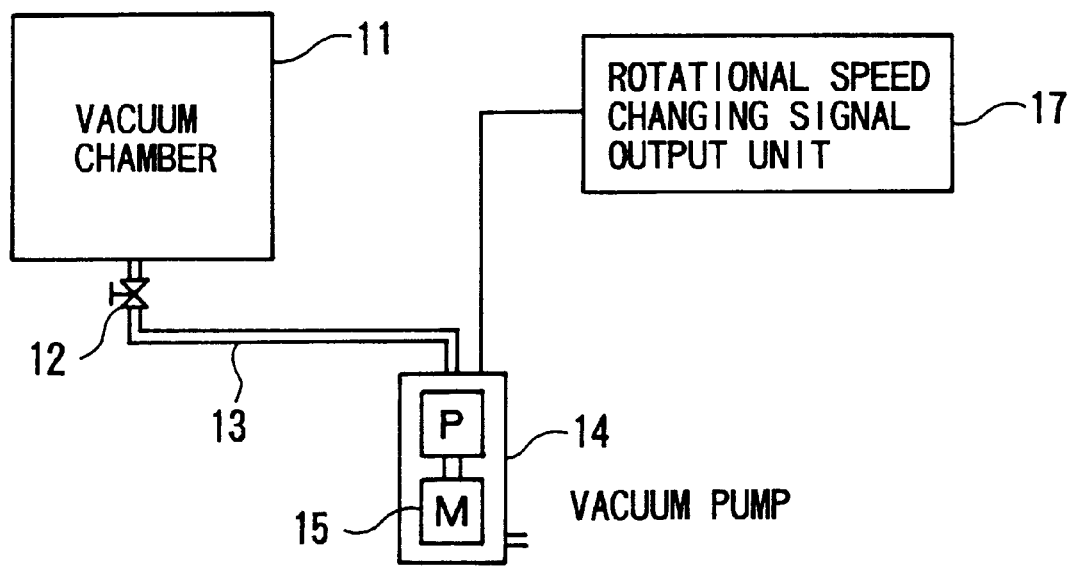

METHOD OF OPERATING VACUUM PUMP

BACKGROUND OF THE INVENTION

1. Field of the Invention

The present invention relates to a method of operating a vacuum pump, and more particularly to a method of operating a vacuum pump for use in an evacuating system for a semiconductor fabrication apparatus.

2. Description of the Related Art

Vacuum pumps for use in evacuating systems for semiconductor fabrication apparatus generally do not have speed control means. Therefore, when such a vacuum pump starts to operate, it will subsequently continuously operate at a constant speed unless there is a reason to stop it. Even when an apparatus such as a semiconductor fabrication apparatus which is being evacuated by a vacuum pump stops its operation and no longer needs to be evacuated, the vacuum pump usually continues its operation. Reasons for continuously operating the vacuum pump even when it is not necessary to evacuate the semiconductor fabrication apparatus are as follows:

First, if the vacuum pump stopped, contaminants such as oil would flow back into the semiconductor fabrication apparatus that needs to be kept highly clean, and contaminate the semiconductor fabrication apparatus. Second, once the vacuum pump stopped, it would take a certain start-up time to operate the vacuum pump again for evacuating the semiconductor fabrication apparatus, resulting in a reduction in the throughput of the semiconductor fabrication apparatus. Third, various sublimated substances are generated in evaporation, sputtering, and CVD processes that are carried out by the semiconductor fabrication apparatus, and are constantly evacuated by the vacuum pump. If the vacuum pump stopped, those sublimated substances would be deposited in the vacuum pump and pipes connected thereto, possibly clogging the pipes or resulting in a failure to restart the vacuum pump.

For the above reasons, the conventional process of operating the vacuum pump suffers the following disadvantages:

Since the vacuum pump always operates at a constant speed, the vacuum pump wastes electric energy because it continues its operation even when the semiconductor fabrication apparatus does not need to be evacuated. Even during a time period when the semiconductor fabrication apparatus is vented to the atmosphere and does not need to be evacuated, it is not preferable to stop operating the vacuum pump only in such a time period.

SUMMARY OF THE INVENTION

It is therefore an object of the present invention to provide a method of operating a vacuum pump in a manner to reduce wasteful electric energy consumption and also to avoid drawbacks which would otherwise be caused if the vacuum pump stopped its operation.

According to the present invention, a method of operating a vacuum pump for use in an evacuating system for a semiconductor fabrication apparatus, comprises the step of reducing the rotational speed of the vacuum pump to an idling rotational speed in response to a signal from the semiconductor fabrication apparatus to be evacuated, thereby to lower electric energy consumption by the vacuum pump.

The vacuum pump may be actuated by a DC motor. The idling rotational speed of the vacuum pump may be adjustable.

According to the present invention, a method of operating a vacuum pump for use in an evacuating system for a semiconductor fabrication apparatus, comprises the steps of operating the vacuum pump at a steady rotational speed to evacuate the semiconductor fabrication apparatus, and reducing the rotational speed of the vacuum pump to an idling rotational speed in response to a signal indicative of an operating state of the semiconductor fabrication apparatus which does not need to be evacuated, thereby to lower electric energy consumption by the vacuum pump.

During a time period in which the semiconductor fabrication apparatus does not need to be evacuated, the rotational speed of the vacuum pump is reduced to the idling rotational speed. Therefore, the electric energy consumption by the vacuum pump is lowered in the time period. Furthermore, since the vacuum pump continuously evacuates the semiconductor fabrication apparatus at the idling rotational speed even during that time period, oil or other contaminants are prevented from flowing back to the semiconductor fabrication apparatus, the throughput of the semiconductor fabrication apparatus is prevented from being undesirably lowered because the vacuum pump is not brought to a full stop, and the vacuum pump and pipes connected thereto are prevented from being clogged by sublimated substances which would otherwise be deposited in the vacuum pump and the pipes if the vacuum pump were entirely stopped.

If the vacuum pump is actuated by the DC motor, then the rotational speed of the vacuum pump can easily be controlled simply by varying the DC voltage applied to the DC motor. Furthermore, if the idling rotational speed of the vacuum pump is adjustable, then since the operator of the semiconductor fabrication apparatus can set the idling rotational speed to a desired value, the idling rotational speed may be selected for a good balance between the electric energy consumption and various troubles caused if the vacuum pump were fully stopped.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1 is a block diagram of a vacuum pump operating system for carrying out a method of operating a vacuum pump according to the present invention;

DETAILED DESCRIPTION OF THE PREFERRED EMBODIMENT

Figure 2A:
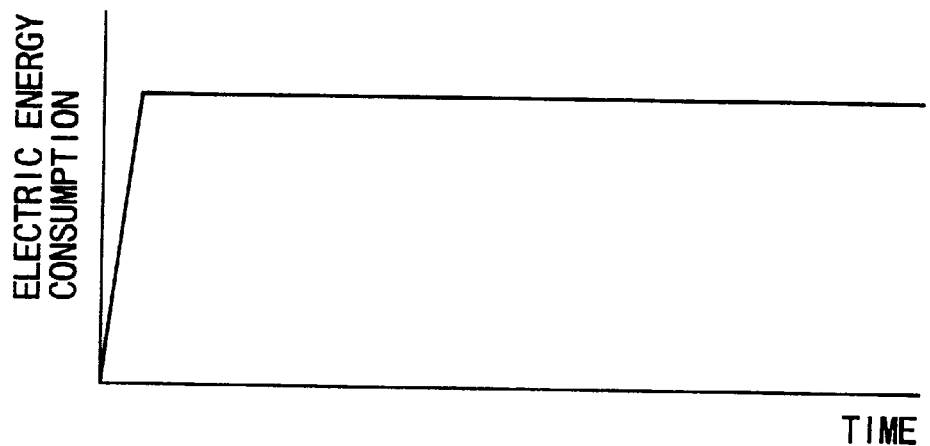
FIG. 2A is a graph showing the manner in which the amount of electric energy consumption by a vacuum pump operated by a conventional method varies.

As shown in FIG. 1, a vacuum pump operating system for carrying out a method of operating a vacuum pump according to the present invention has a vacuum chamber 11 which is to be evacuated, such as of a vacuum evaporation apparatus, a sputtering apparatus, or an ion implanter. The vacuum chamber 11 is connected through a valve 12 to a vacuum pipe 13 connected to a vacuum pump 14. The vacuum pump 14 has a DC motor 15 for operating the vacuum pump 14 to evacuate the vacuum chamber 11. Since the rotational speed of the DC motor 15 is linearly variable depending on the magnitude of a DC voltage applied to the DC motor 15, the rotational speed of the DC motor 15 can greatly be varied by varying the DC voltage applied to the DC motor 15.

The vacuum chamber 11 which is to be evacuated is associated with a rotational speed changing signal output unit 17. When a time period in which the vacuum chamber 11 does not need to be evacuated is reached, the rotational speed changing signal output unit 17 responds to an operating state of the vacuum chamber 11, and outputs a signal to lower the rotational speed of the vacuum pump 14 to the vacuum pump 14. Therefore, when the vacuum chamber 11 is vented to the atmosphere and is no longer required to be evacuated, the rotational speed changing signal output unit 17 issues a signal indicative of an idling rotational speed to the vacuum pump 14 in response to the operating state of the vacuum chamber 11. In response to the supplied signal from the rotational speed changing signal output unit 17, the voltage applied to the DC motor 15 is varied to reduce the rotational speed of the vacuum pump 14 to the idling rotational speed.

FIG. 2A shows showing the manner in which the amount of electric energy consumption by a vacuum pump operated by a conventional method varies. According to the conventional method, as shown in FIG. 2A, after the vacuum pump has began to operate, the electric energy consumption by the vacuum pump remains constant with time. The electric energy consumption by the vacuum pump remains constant because the vacuum pump operates at a constant rotational speed even during a time period in which the vacuum chamber does not need to be evacuated by the vacuum pump.

Figure 2B:
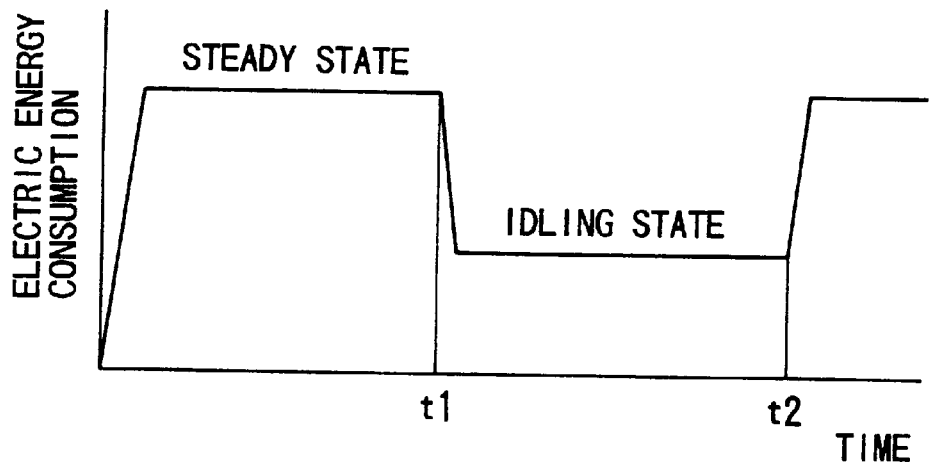
FIG. 2B is a graph showing the manner in which the amount of electric energy consumption by a vacuum pump operated by the method according to the present invention varies.

FIG. 2B shows the manner in which the amount of electric energy consumption by the vacuum pump 14 operated by the method according to the present invention varies. In the method according to the present invention, after the vacuum pump 14 has began to operate, the vacuum pump 14 operates in a steady state at a steady rotational speed to evacuate the vacuum chamber 11, and the electric energy consumption by the vacuum pump 14 remains constant in the steady state as with the conventional method. When the rotational speed changing signal output unit 17 issues a signal indicative of an idling rotational speed to the vacuum pump 14 at a time t1, the voltage applied to the DC motor 15 is lowered to reduce the rotational speed of the vacuum pump 14 to the idling rotational speed. Therefore, the electric energy consumption by the vacuum pump 14 is reduced.

At a time t2 when the vacuum chamber 11 needs to be evacuated again, the rotational speed changing signal output unit 17 issues a signal indicative of the steady rotational speed to the vacuum pump 14 in response to the operating state of the vacuum chamber 11. The voltage applied to the DC motor 15 is now increased to a steady level, increasing the rotational speed of the vacuum pump 14 to the steady rotational speed. Thus, the electric energy consumption by the vacuum pump 14 is increased to the steady level.

In the method of controlling the vacuum pump 14 according to the present invention, the vacuum pump 14 is operated in an idling state during a time period in which the vacuum chamber 11 does not need to be evacuated, and hence the electric energy consumption by the vacuum pump 14 is reduced in the idling state. If the rotational speed of the vacuum pump 14 in the idling mode is adjustable, then the rotational speed of the vacuum pump 14 in the idling state may be set depending on the characteristics of the vacuum chamber to be evacuated, so that the vacuum pump 14 may provide a minimum evacuating capability that is required in the idling state.

Since the vacuum pump continuously evacuates the semiconductor fabrication apparatus at the idling rotational speed even during a time period in which the semiconductor fabrication apparatus does not need to be evacuated, oil or other contaminants are prevented from flowing back to the semiconductor fabrication apparatus, the throughput of the semiconductor fabrication apparatus is prevented from being undesirably lowered because the vacuum pump is not brought to a full stop, and the vacuum pump and pipes connected thereto are prevented from being clogged by sublimated substances which would otherwise be deposited in the vacuum pump and the pipes if the vacuum pump were entirely stopped.

In the illustrated embodiment, the DC motor 15 is used to actuate the vacuum pump 14, and the rotational speed of the DC motor 15 is varied by varying the magnitude of the DC voltage applied to the DC motor 15. However, an AC induction motor with a built-in inverter may be used to actuate the vacuum pump 14, and the rotational speed of the AC induction motor may be varied.

In the illustrated embodiment, the rotational speed of the vacuum pump 14 is switched to the idling rotational speed in response to the operating state of the vacuum chamber 11 to be evacuated by the vacuum pump 14. However, the operator of the vacuum chamber 11 to be evacuated by the vacuum pump 14 may manually switch the rotational speed of the vacuum pump 14 to the idling rotational speed.

According to the present invention, since the electric energy consumption by the vacuum pump can be reduced, the vacuum pump can be operated with a reduced amount of electric energy. If the rotational speed of the vacuum pump lowered to the idling rotational speed in response to the operating state of the vacuum chamber to be evacuated by the vacuum pump, then the rotational speed can automatically be switched to the idling rotational speed without manual intervention for energy conservation. Furthermore, if the rotational speed of the vacuum pump is variably controlled using the DC motor, then the overall mechanical arrangement is relatively simple because an external inverter and a mechanical speed control gear system are not required.

Although a certain preferred embodiment of the present invention has been shown and described in detail, it should be understood that various changes and modifications may be made therein without departing from the scope of the appended claims.

What is claimed is:

1. A method of operating a vacuum pump actuated by a motor for use in an evacuating system for a semiconductor fabrication apparatus, comprising the steps of:

operating the motor actuating the vacuum pump at a steady rotational speed to evacuate the semiconductor fabrication apparatus; and reducing the rotational speed of the motor actuating the vacuum pump to an idling rotational speed in response to a signal indicative of an operating state of the semiconductor fabrication apparatus during a time period in which the semiconductor fabrication apparatus does not need to be evacuated, thereby reducing electric energy consumption by the motor actuating the vacuum pump and preventing oil and the other contaiminatants from flowing back to the semiconductor fabrication apparatus.

2. The method according to claim 1, wherein said vacuum pump is actuated by a DC motor.

3. The method according to claim 1, wherein said idling rotational speed of the motor actuating the vacuum pump is adjustable.

4. The method according to claim 1, wherein said vacuum pump is actuated by an AC induction motor.

* * * * *